United States Patent
Roe (10) Patent No.: US 10,779,532 B2
(45) Date of Patent: Sep. 22, 2020

(54) METHODS AND COMPOSITIONS FOR KILLING OF INSECT PEST EGGS

(71) Applicant: North Carolina State University, Raleigh, NC (US)

(72) Inventor: Richard Michael Roe, Middlesex, NC (US)

(73) Assignee: NORTH CAROLINA STATE UNIVERSITY, Raleigh, NC (US)

(*) Notice: Subject to any disclaimer, the term of this patent is extended or adjusted under 35 U.S.C. 154(b) by 0 days.

(21) Appl. No.: 16/321,126

(22) PCT Filed: Aug. 2, 2017

(86) PCT No.: PCT/US2017/045064
§ 371 (c)(1),
(2) Date: Jan. 28, 2019

(87) PCT Pub. No.: WO2018/026901
PCT Pub. Date: Feb. 8, 2018

(65) Prior Publication Data
US 2019/0166830 A1 Jun. 6, 2019

Related U.S. Application Data

(60) Provisional application No. 62/371,314, filed on Aug. 5, 2016.

(51) Int. Cl.
*A01N 35/02* (2006.01)

(52) U.S. Cl.
CPC .................. *A01N 35/02* (2013.01)

(58) Field of Classification Search
CPC .................................................. A01N 35/02
See application file for complete search history.

(56) References Cited

U.S. PATENT DOCUMENTS

| 6,820,283 B2 * | 11/2004 | Graneto, III | A45D 19/14 |
| | | | 2/171.2 |
| 7,288,573 B2 | 10/2007 | Roe | |
| 2009/0227687 A1 * | 9/2009 | Found | A01N 49/00 |
| | | | 514/739 |
| 2015/0004153 A1 * | 1/2015 | Jones | A01N 37/02 |
| | | | 424/94.64 |

FOREIGN PATENT DOCUMENTS

| WO | 2008/087148 | 7/2008 |
| WO | 2009/002485 | 12/2008 |

OTHER PUBLICATIONS

Aguiar RWS, dos Santos SF, da Silva Morgado F, Ascencio SD, de Mendonga Lopes M, Viana KF, et al. (2015) Insecticidal and Repellent Activity of *Siparuna guianensis* Aubl. (Negramina) against Aedes aegypti and Culex quinquefasciatus. PLoS One 10(2): e0116765. (Year: 2015).*

International Search Report and Written Opinion, PCT/US2017/045064, dated Oct. 26, 2017, 7 pages.

Braga et al "Insecticidal activity of 2-tridecanone against the cowpea weevil *Callosobruchus maculatus* (Coleoptera: Bruchidae)" Anais Da Academia Brasileira De Ciências, 79(1): 35-39 2007.

Kramer et al "Effects of 2-Tridecanone and Analogues on the Reproduction and Mortality of Stored Product Insects" Journal of the Kansas Entomological Society, 58(2):254-260 1985.

Marr et al "Volatile insecticidal compounds and chemical variability of hawaiian Zanthoxylum (*Rutaceae*) species" Biomedical Systematics and Ecology, 20(3): 209-217 1992.

Campbell et al. "Complications with Controlling Insect Eggs, Insecticides Resistance" Intech, pp. 83-96 2016.

Jones et al. "Review of Common Therapeutic Options in the United States for the Treatment of Pediculosis Capitis" Clinical Infectious Diseases, 36:1355-1361 2003.

Verma et al. "Treatment of Pediculosis Capitis" Indian J. Derm., 60(3):238-247 2015.

* cited by examiner

*Primary Examiner* — Doan T Phan
(74) *Attorney, Agent, or Firm* — Myers Bigel, P.A.

(57) ABSTRACT

The invention is directed to ovicidal compositions comprising at least 2-undecanone and/or 2-tridecanone, and methods for the use of the compositions for the killing of insect pest eggs.

19 Claims, 4 Drawing Sheets

METHODS AND COMPOSITIONS FOR KILLING OF INSECT PEST EGGS

STATEMENT OF PRIORITY

This application is a 35 U.S.C. § 371 national phase entry of International Application No. PCT/US2017/045064, filed Aug. 5, 2017, claims the benefit, under 35 U.S.C. § 119 (e), of U.S. Provisional Application No. 62/371,314 filed on Aug. 5, 2016 in the United States Patent and Trademark Office, the entire contents of each of which is incorporated by reference herein.

FIELD OF THE INVENTION

The present invention concerns compositions and methods for the control of insect pest eggs.

BACKGROUND OF THE INVENTION

The ability to control insect pests is an ongoing problem. In particular, even when a composition may be effective in killing insects, the eggs are typically not similarly destroyed. This allows for a cycle of re-infestation requiring repeated treatments. Further many insect pests are now resistant to the available pesticides. Thus, a need exists for new compositions and formulations that can control insect pests and their eggs.

SUMMARY OF THE INVENTION

One aspect of the invention provides a method of killing insect pest eggs, comprising contacting the insect eggs with an effective amount of a composition comprising 2-undecanone and/or 2-tridecanone, thereby killing the insect eggs.

A second aspect provides a method of killing lice eggs, comprising contacting the lice eggs with an effective amount of a composition comprising 2-undecanone and/or 2-tridecanone, thereby killing the lice eggs.

A third aspect provides a method of killing lice eggs on a subject infested with lice eggs or suspected of being infested with lice eggs, comprising applying to the subject an effective amount of a composition comprising 2-undecanone and/or 2-tridecanone, thereby killing the lice eggs on the subject.

A fourth aspect of the invention provides a method of killing insect eggs, comprising contacting the insect eggs with an effective amount of a composition comprising 2-undecanone and/or 2-tridecanone, and diatomaceous earth, thereby killing the insect eggs.

A fifth aspect provides a method of killing lice eggs, comprising contacting the lice eggs with an effective amount of a composition comprising 2-undecanone and/or 2-tridecanone, and diatomaceous earth, thereby killing the lice eggs.

A sixth aspect provides a method of killing lice eggs on a subject infested with lice eggs or suspected of being infested with lice eggs, comprising applying to a subject in need thereof an effective amount of a composition comprising 2-undecanone and/or 2-tridecanone, and diatomaceous earth, thereby killing the lice eggs on the subject.

These and other aspects of the invention are set forth in more detail in the description of the invention below.

DETAILED DESCRIPTION

The present invention now will be described hereinafter with reference to the accompanying drawings and examples, in which embodiments of the invention are shown. This description is not intended to be a detailed catalog of all the different ways in which the invention may be implemented, or all the features that may be added to the instant invention. For example, features illustrated with respect to one embodiment may be incorporated into other embodiments, and features illustrated with respect to a particular embodiment may be deleted from that embodiment. Thus, the invention contemplates that in some embodiments of the invention, any feature or combination of features set forth herein can be excluded or omitted. In addition, numerous variations and additions to the various embodiments suggested herein will be apparent to those skilled in the art in light of the instant disclosure, which do not depart from the instant invention. Hence, the following descriptions are intended to illustrate some particular embodiments of the invention, and not to exhaustively specify all permutations, combinations and variations thereof.

Unless otherwise defined, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention.

All publications, patent applications, patents and other references cited herein are incorporated by reference in their entireties for the teachings relevant to the sentence and/or paragraph in which the reference is presented.

Unless the context indicates otherwise, it is specifically intended that the various features of the invention described herein can be used in any combination. Moreover, the present invention also contemplates that in some embodiments of the invention, any feature or combination of features set forth herein can be excluded or omitted. To illustrate, if the specification states that a composition comprises components A, B and C, it is specifically intended that any of A, B or C, or a combination thereof, can be omitted and disclaimed singularly or in any combination.

As used in the description of the invention and the appended claims, the singular forms "a," "an" and "the" are intended to include the plural forms as well, unless the context clearly indicates otherwise.

Also as used herein, "and/or" refers to and encompasses any and all possible combinations of one or more of the associated listed items, as well as the lack of combinations when interpreted in the alternative ("or").

The term "about," as used herein when referring to a measurable value such as a dosage or time period and the like refers to variations of ±20%, ±10%, ±5%, ±1%, ±0.5%, or even ±0.1% of the specified amount.

As used herein, phrases such as "between X and Y" and "between about X and Y" should be interpreted to include X and Y. As used herein, phrases such as "between about X and Y" mean "between about X and about Y" and phrases such as "from about X to Y" mean "from about X to about Y."

The term "comprise," "comprises" and "comprising" as used herein, specify the presence of the stated features, integers, steps, operations, elements, and/or components, but do not preclude the presence or addition of one or more other features, integers, steps, operations, elements, components, and/or groups thereof.

As used herein, the transitional phrase "consisting essentially of" means that the scope of a claim is to be interpreted to encompass the specified materials or steps recited in the claim and those that do not materially affect the basic and novel characteristic(s) of the claimed invention. Thus, the term "consisting essentially of" when used in a claim of this invention is not intended to be interpreted to be equivalent to "comprising."

As used herein, the terms "increase," "increasing," "increased," "enhance," "enhanced," "enhancing," and "enhancement" (and grammatical variations thereof) describe an elevation of at least about 25%, 50%, 75%, 100%, 150%, 200%, 300%, 400%, 500% or more as compared to a control.

As used herein, the terms "reduce," "reduced," "reducing," "reduction," "diminish," and "decrease" (and grammatical variations thereof), describe, for example, a decrease of at least about 5%, 10%, 15%, 20%, 25%, 35%, 50%, 75%, 80%, 85%, 90%, 95%, 97%, 98%, 99%, or 100% as compared to a control. In particular embodiments, the reduction can result in no or essentially no (i.e., an insignificant amount, e.g., less than about 10% or even 5%) detectable activity or amount.

The present invention provides a method of killing an insect pest egg, comprising contacting the insect pest egg or applying to a subject or substrate, in an amount effective to kill the insect pest egg, a compound of Formula I:

(I)

wherein R is $C_4$-$C_{20}$ linear or branched alkyl. In some embodiments, the compound of Formula I is linear. In some embodiments, the compound of Formula I may be $C_7$ to $C_{13}$ alkyl. In representative embodiments, the compound comprises 2-undecanone (R is $C_9$) and/or 2-tridecanone (R is $C_{11}$). In particular embodiments, the insect pest is a louse.

As used herein, the term "alkyl" (e.g., alkyl, alkylcarboxy, alkylphenyl, etc.) refers to a straight or branched chain hydrocarbon having from 4 to 20 carbon atoms. The alkyl may optionally be substituted with substituents selected from the group which includes halo, lower alkoxy, lower alkylsulfanyl, lower alkylsulfenyl, lower alkylsulfonyl, oxo, hydroxy, mercapto, amino optionally substituted by alkyl, carboxy, carbamoyl optionally substituted by alkyl, aminosulfonyl optionally substituted by a substituent selected from the group including alkyl, nitro, cyano, halo and lower perfluoroalkyl, multiple degrees of substitution being allowed. Examples of "alkyl" as used herein include, but are not limited to, n-butyl, n-pentyl, isobutyl, pentyl, hexyl, octyl, nonyl, undecyl, the like.

The term "lower" as used herein with respect to alkyl moieties means linear or branched chain hydroxycarbon having from 1-4 carbon atoms Subjects to be treated with compounds of the present invention include both human and animal subjects (e.g., dogs, cats, horses, cattle). Subjects may be directly or indirectly treated, such as by applying the active compound to the skin of the subject, or by applying the active compound to an article worn by or otherwise protecting the subject.

In some embodiments, substrates may be treated with compounds of the present invention. Such substrates include, but are not limited to, fabrics (e.g., clothing, towels, bed clothing, and the like), floors, plants, containers, walls, pools or open bodies of water, air, soil, nets, paper, trash containers, dumps, etc.

The compounds of the invention may be present in a composition, e.g., a formulation suitable for delivery of the compounds. The compositions (2-undecanone and/or 2-tridecanone) as described herein can be formulated in a variety of ways, including but not limited to mixing with a solid carrier, a liquid carrier, or a gaseous carrier. In addition, a surfactant, a sticking agent, a dispersion agent, a stabilizer, and other auxiliaries or additives may be added.

A formulation for the present invention includes but is not limited to an oil solution (oil emulsion), an emulsifiable concentrate, a wettable powder, a flowable formulation, granules, dusts, an aerosol (e.g., powdered, liquid), a shampoo, a conditioner, a creme rinse, a mousse, a foam, a lotion, a gel, a powder (e.g., a dry shampoo), a paste, or an ointment.

A solid carrier useful for the formulation may include, but is not limited to, fine powder or granules of cellulose, clays (e.g. kaolin clay, diatomaceous earth, synthetic hydrated silicon oxide, bentonite, Fubasami clay, acid clay), talc, ceramics, and/or other inorganic minerals (e.g. sericite, quartz, sulfur, active carbon, calcium carbonate, hydrated silicon oxide). In representative embodiments, the formulation comprises 2-undecanone and/or 2-tridecanone, and diatomaceous earth. Diatomaceous earth (DE) is formed from the fossilized remains of diatoms, the skeletons of which contain silica. The particle size of DE is typically about 1 µm to about 200 µm and the chemical composition is about 80 to 90% silica, with about 2 to 4% alumina and about 0.5 to 2% iron oxide.

Liquid formulations may be aqueous-based or non-aqueous (i.e., organic solvents), or combinations thereof, and may be employed as a foam, a gel, a suspension, an emulsion, a microemulsion, an emulsifiable concentrate, a shampoo, a conditioner, a creme rinse, a mousse, a lotion, a paste, an ointment, and the like. The ingredients may include rheological agents, surfactants, emulsifiers, dispersants, or polymers. Thus, a liquid carrier useful for the formulation may include, but is not limited to, water; organic solvents such as alcohols including, but not limited to, methanol and ethanol; or vegetable/plant oils including but not limited to soybean oil and/or cottonseed oil.

Thus, in representative embodiments, a composition or formulation of the invention may be contacted with or applied to a subject in the form of a dry shampoo, liquid shampoo, conditioner, creme rinse, mousse, foam, lotion, ointment, and/or aerosol that comprises the composition. In some embodiments, the compositions or formulations may be provided in a microencapsulated form. In representative embodiments, a formulation may be a dry shampoo, which may be applied in any manner, for example, as a spray or as a dry powder. For example, a spray may comprise 2-undecanone or 2-tridecanone, and DE and an alcohol applied using an aerosol spray can. Alternatively, the dry shampoo may comprise 2-undecanone or 2-tridecanone, and DE that may be applied using a squeeze bottle.

An example gaseous carrier or propellant useful for the formulation may include air, nitrogen and/or carbon dioxide.

A surfactant useful with the invention may include, but is not limited to, an alkyl sulfate, an alkylsulfonate, an alkylarylsulfonate, an alkyl aryl ether, a polyoxyethylenealkyl aryl ether, a polyethylene glycol ether, a polyhydric alcohol ether, glycerine, polyethylene glycol, a protein, a lipo protein, a glycoprotein, a lipoglycoprotein, a plant oil, an animal oil and/or a sugar alcohol derivative.

Example sticking agents, the dispersing agent, and other auxiliaries or additives include casein, gelatin, polysaccharides such as starch, gum arabic, cellulose derivatives and alginic acid, lignin derivatives, bentonite, sugars and/or synthetic water-soluble polymers such as polyvinyl alcohol, polyvinylpyrrolidone and/or polyacrylic acid.

An example stabilizer can include PAP (acid isopropyl phosphate), BHT (2,6-di-tert-butyl-4-methyphenol), BHA (mixture of 2-tert-butyl-4-methoxyphenol and 3-tert-butyl-4-methoxyphenol), vegetable oils, mineral oils, surfactants, fatty acids and/or esters of fatty acids.

The compositions or formulations of the invention may be applied by any method known in the art including, for example, spraying, pouring, dipping, or applied using a cap fitted to the head, for example, for killing head lice eggs. The compositions or formulations may be in the form of concentrated liquids, solutions, suspensions, sprays, powders, and the like, formulated to deliver an ovicidal effective concentration of the composition.

The compositions and formulations of the invention may be used to kill any insect pest egg. In particular, the present invention is useful for killing lice eggs. Head lice present a multi-billion-dollar problem worldwide. Current control methods include the use of insecticides (typically, an insect nerve poison). These methods frequently fail because of resistance that has developed to the insecticide. Moreover, most products that have been developed kill larvae and adults but not the eggs (e.g., benzyl alcohol, pyrethrins and permethrins). Current treatments for killing all forms of lice are highly flammable and/or toxic and typically used only as a last resort to address highly resistant forms of lice (e.g., malthion, lidane). The present invention overcomes this problem by providing compositions and/or formulations that can kill all stages of lice development, adult, larval, and egg.

Accordingly, the present invention provides compositions comprising naturally occurring non-toxic products that surprisingly kill insect eggs. Thus, in some embodiments, the present invention provides a method of killing insect eggs, comprising contacting the insect pest eggs with an effective amount of a composition comprising 2-undecanone and/or 2-tridecanone, thereby killing the insect pest eggs. In other embodiments, a method of killing lice eggs (nits) is provided, comprising contacting the lice eggs with an effective amount of a composition comprising 2-undecanone and/or 2-tridecanone, thereby killing the lice eggs. Additionally provided is a method of killing lice eggs on a subject infested with lice eggs or suspected of being infested with lice eggs (e.g., a subject in need), comprising applying to the subject an effective amount of a composition comprising 2-undecanone and/or 2-tridecanone, thereby killing the lice eggs on the subject. The composition may comprise 2-undecanone or 2-tridecanone or a combination of 2-undecanone and 2-tridecanone in various insecticidal and/or ovidical ratios. In representative embodiments, the composition may further comprise DE.

As used herein, "a subject infested with lice eggs" or "suspected of being infested with lice eggs" may have one or more lice eggs on their person (head, scalp, hair, eye lashes, eye brows).

In some embodiments, the formulation comprising 2-undecanone and 2-tridecanone and DE can be used to prevent or reduce the occurrence or risk of infestation and/or re-infestation by an insect pest. Thus, in some embodiments, a method for preventing or reducing risk of infestation and/or re-infestation by an insect pest (e.g., lice, head lice, body lice) is provided comprising contacting the insect pest eggs with an effective amount of a composition comprising 2-undecanone and/or 2-tridecanone, and DE and optionally oil, thereby killing the insect pest eggs and preventing or reducing the risk of infestation and/or re-infestation by the insect pest. For example, the risk of infestation or re-infestation by lice can be reduced because the 2-undecanone and 2-tridecanone (with/without and DE) kill the eggs and while the 2-undecanone and 2-tridecanone may evaporate, the DE that is left behind kills any lice that may be picked up after treatment of a prior infestation. The effectiveness at reducing the risk of infestation or re-infestation can be further improved by the addition of oil(s) (or other binders/carriers) to the formulation (e.g., plant based oils), which reduce the volatility of the 2-undecanone and 2-tridecanone, thereby providing additional time for the compounds to kill the insect pest eggs as compared to a formulation that does not comprise the oils (or other binders/carriers). In some embodiments, increasing the ratio of 2-tridecanone to 2-undecanone (e.g., 3:1) can decrease the evaporation of the formulation, and therefore, increases the time that the therapeutic effect (egg killing) of the formulation is retained from hours to days as compared to a formulation that does not comprise a higher ratio of 2-tridecanone to 2-undecanone.

A formulation for reducing infestation or re-infestation can be therapeutically effective for at least about one hour to about seven days (e.g., about 1 hour, 2 hours, 3 hours, 4 hours, 5 hours, 6 hours, 7 hours, 8 hours, 9 hours, 10 hours, 12 hours, 15 hours, 20 hours, 1 day, 2 days, 3 days, 4 days, 5 days, 6 days, 7 days, and the like, or any range or value therein). Thus, in some embodiments, a formulation for reducing infestation or re-infestation may be therapeutically effective for at least about 1 hour to about 4 hours, about 1 hour to about 6 hours, about 1 hour to about 12 hours, about 1 hour to about 18 hours, about 6 hours to about 12 hours, about 6 hours to about 18 hours, about 6 hours to about 24 hours, about 6 hours to about 2 days, about 6 hours to about 4 days, about 12 hours to about 1 day, about 12 hours to about 6 days, about 1 day to about 6 days, about 1 day to about 5 days, about 1 day to about 4 days, about 1 day to about 3 days, about 1 day to about 2 days, about 2 days to about 6 days, about 2 days to about 5 days, about 2 days to about 4 days, about 2 days to about 3 days, and the like, or any range or value therein.

In some embodiments, the contacting or applying comprises covering a site of infestation on a subject having or suspected of having lice eggs (e.g., the scalp and hair) with a cap, wherein the cap comprises an inner side and an outer side, and the inner side is in contact with the site of infestation on the subject and comprises the composition; and massaging the cap while the cap is on the site of infestation, thereby massaging the composition into the subject's hair and scalp. The composition may be provided in the cap in a liquid or a dry formulation that is massaged into the hair and scalp. Alternatively or in addition, in some embodiments, the composition may be formulated as a gas or aerosol, which is introduced into the cap when the cap covers the site of infestation.

The concentration of the 2-undecanone and/or 2-tridecanone will vary depending upon the nature of the particular formulation, as for example, whether it is a concentrate or to be used directly. Thus, for example, the 2-undecanone and/or 2-tridecanone will be present in the composition in a concentration of at least about 0.01% by weight to about 100% by weight of the total composition (e.g., about 0.01, 0.05, 0.1, 0.5, 1, 2, 3, 4, 5, 6, 7, 8, 9, 10, 15, 20, 25, 30, 35, 40, 45, 50, 55, 60, 65, 70, 75, 80, 85, 90, 95, 96, 97, 98, 99, 99.9, 100% and any value or range therein). A carrier may be from 0.1% to 99.999% by weight of the total composition (e.g., about 0.1, 0.5, 1, 2, 3, 4, 5, 6, 7, 8, 9, 10, 15, 20, 25, 30, 35, 40, 45, 50, 55, 60, 65, 70, 75, 80, 85, 90, 95, 96, 97, 98, 99, 99.9, 99.99, 99.999% or any value or range therein). In some embodiments, an ovicidal effective amount of the composition can comprise about 0.01% to about 50%, about 0.01% to about 40%, about 0.01% to about 30%, about 0.01% to about 20%, about 0.01% to about 15%, about 0.01% to about 10%, about 0.01% to about 8%, about 0.1% to about 50%, about 0.1% to about 40%, about 0.1% to about 30%, about 0.1% to about 20%, about 0.1% to about 15%, about 0.1% to about 10%, about 0.1% to about 8%, about 1% to about 50%, about 1% to about 40%, about 1% to about 30%, about 1% to about 20%, about 1% to about 15%, about 1% to about 10%, about 1% to about 8% (w/w in solid formulations and w/v in liquid formulations) of the total amount of 2-undecanone and/or 2-tridecanone and any range or value therein.

In some embodiments, when a composition or formulation of the invention comprises both 2-undecanone and 2-tridecanone, the 2-undecanone and/or 2-tridecanone may be present in a ratio from 0.01:20 to 20:0.01 of. In some embodiments, the ratio of 2-undecanone:2-tridecanone can be 6:1, 5:1, 4:1.3:1, 2:1, 1:1, 1:2, 1:3, 1:4, 1:5, 1:6, and the like and any range or value therein. In representative embodiments, the ratio of 2-undecanone:2-tridecanone can be 1:3. In some embodiments, a composition or formulation of the invention may comprise one or more additional methyl ketones, wherein R=C7, C8, C11-C20, or any combination thereof.

In some embodiments, the formulation of 2-undecanone and/or 2-tridecanone can comprise diatomaceous earth (DE) in an amount of about 0.1% to about 99.9%. Thus, in some embodiments the formulation comprises about 0.1% 2-undecanone and/or 2-tridecanone and about 1% DE, about 0.5% 2-undecanone and/or 2-tridecanone and about 1% DE, about 1% 2-undecanone and/or 2-tridecanone and about 1% DE, about 5% 2-undecanone and/or 2-tridecanone and about 1% DE, about 8% 2-undecanone and/or 2-tridecanone and about 1% DE, about 10% 2-undecanone and/or 2-tridecanone and about 1% DE, about 15% 2-undecanone and/or 2-tridecanone and about 1% DE, about 20% 2-undecanone and/or 2-tridecanone and about 1% DE, about 0.1% 2-undecanone and/or 2-tridecanone and about 5% DE, about 0.5% 2-undecanone and/or 2-tridecanone and about 5% DE, about 1% 2-undecanone and/or 2-tridecanone and about 5% DE, about 5% 2-undecanone and/or 2-tridecanone and about 5% DE, about 8% 2-undecanone and/or 2-tridecanone and about 5% DE, about 10% 2-undecanone and/or 2-tridecanone and about 5% DE, about 15% 2-undecanone and/or 2-tridecanone and about 5% DE, about 20% 2-undecanone and/or 2-tridecanone and about 5% DE, about 0.1% 2-undecanone and/or 2-tridecanone and about 10% DE, about 0.5% 2-undecanone and/or 2-tridecanone and about 10% DE, about 1% 2-undecanone and/or 2-tridecanone and about 10% DE, about 5% 2-undecanone and/or 2-tridecanone and about 10% DE, about 8% 2-undecanone and/or 2-tridecanone and about 10% DE, about 10% 2-undecanone and/or 2-tridecanone and about 10% DE, about 15% 2-undecanone and/or 2-tridecanone and about 10% DE, about 20% 2-undecanone and/or 2-tridecanone and about 10% DE, about 0.1% 2-undecanone and/or 2-tridecanone and about 15% DE, about 0.5% 2-undecanone and/or 2-tridecanone and about 15% DE, about 1% 2-undecanone and/or 2-tridecanone and about 15% DE, about 5% 2-undecanone and/or 2-tridecanone and about 15% DE, about 8% 2-undecanone and/or 2-tridecanone and about 15% DE, about 10% 2-undecanone and/or 2-tridecanone and about 15% DE, about 15% 2-undecanone and/or 2-tridecanone and about 15% DE, about 20% 2-undecanone and/or 2-tridecanone and about 15% DE, about 0.1% 2-undecanone and/or 2-tridecanone and about 20% DE, about 0.5% 2-undecanone and/or 2-tridecanone and about 20% DE, about 1% 2-undecanone and/or 2-tridecanone and about 20% DE, about 5% 2-undecanone and/or 2-tridecanone and about 20% DE, about 8% 2-undecanone and/or 2-tridecanone and about 20% DE, about 10% 2-undecanone and/or 2-tridecanone and about 20% DE, about 15% 2-undecanone and/or 2-tridecanone and about 20% DE, about 20% 2-undecanone and/or 2-tridecanone and about 20% DE, about 0.1% 2-undecanone and/or 2-tridecanone and about 25% DE, about 0.5% 2-undecanone and/or 2-tridecanone and about 25% DE, about 1% 2-undecanone and/or 2-tridecanone and about 25% DE, about 5% 2-undecanone and/or 2-tridecanone and about 25% DE, about 8% 2-undecanone and/or 2-tridecanone and about 25% DE, about 10% 2-undecanone and/or 2-tridecanone and about 25% DE, about 15% 2-undecanone and/or 2-tridecanone and about 25% DE, and/or about 20% 2-undecanone and/or 2-tridecanone and about 25% DE. In representative embodiments, the formulation of 2-undecanone and/or 2-tridecanone can comprise a ratio of 2-undecanone:2-tridecanone of 1:3 and diatomaceous earth (DE) in an amount of about 0.1% to about 99.9%. In some embodiments, a formulation can further comprise oils and/or other carriers to reduce the evaporation of the 2-undecanone and/or 2-tridecanone, thereby retaining the therapeutic effect (egg killing) of the formulation over a period of time from hours to days (e.g., at least about one hour to about seven days (e.g., at least about 1 hour, 2 hours, 3 hours, 4 hours, 5 hours, 6 hours, 7 hours, 8 hours, 9 hours, 10 hours, 12 hours, 15 hours, 20 hours, 1 day, 2 days, 3 days, 4 days, 5 days, 6 days, 7 days, about 1 hour to about 4 hours, about 1 hour to about 6 hours, about 1 hour to about 12 hours, about 1 hour to about 18 hours, about 6 hours to about 12 hours, about 6 hours to about 18 hours, about 6 hours to about 24 hours, about 6 hours to about 2 days, about 6 hours to about 4 days, about 12 hours to about 1 day, about 12 hours to about 6 days, about 1 day to about 6 days, about 1 day to about 5 days, about 1 day to about 4 days, about 1 day to about 3 days, about 1 day to about 2 days, about 2 days to about 3 days, about 2 days to about 4 days, about 2 days to about 5 days, about 2 days to about 6 days, and the like, or any range or value therein).

In some embodiments, a formulation of 2-undecanone and/or 2-tridecanone may comprise a solvent, for example, ethanol. Thus, for example, a formulation of the invention may comprise about 0.01% to about 99.9% ethanol. Thus, in some embodiments the formulation comprises about 0.1% 2-undecanone and/or 2-tridecanone and about 1% to about 99.9% ethanol; about 0.5% 2-undecanone and/or 2-tridecanone and about 1% to about 99.5% ethanol, about 1%

2-undecanone and/or 2-tridecanone and about 1% to about 99% ethanol; about 5% 2-undecanone and/or 2-tridecanone and about 1% to about 95% ethanol; about 8% 2-undecanone and/or 2-tridecanone and about 1% to about 92% ethanol; about 10% 2-undecanone and/or 2-tridecanone and about 1% to about 90% ethanol; about 15% 2-undecanone and/or 2-tridecanone and about 1% to about 85% ethanol; about 20% 2-undecanone and/or 2-tridecanone and about 1% to about 80% ethanol; or about 25% 2-undecanone and/or 2-tridecanone and about 1% to about 75% ethanol; and the like.

In some embodiments, the formulation of 2-undecanone and/or 2-tridecanone can comprise diatomaceous earth (DE) and a solvent, such as ethanol. Thus, in some embodiments the formulation comprises about 0.1% 2-undecanone and/or 2-tridecanone, about 1% DE, and about 1% to about 98.9% ethanol; about 0.5% 2-undecanone and/or 2-tridecanone, about 1% DE, and about 1% to about 98.5% ethanol; about 1% 2-undecanone and/or 2-tridecanone, about 1% DE, and about 1% to about 98% ethanol; about 5% 2-undecanone and/or 2-tridecanone, about 1% DE, and about 1% to about 94% ethanol; about 8% 2-undecanone and/or 2-tridecanone, about 1% DE, and about 1% to about 91% ethanol; about 10% 2-undecanone and/or 2-tridecanone, about 1% DE, and about 1% to about 89% ethanol; about 15% 2-undecanone and/or 2-tridecanone, about 1% DE, and about 1% to about 84% ethanol; about 20% 2-undecanone and/or 2-tridecanone, about 1% DE, and about 1% to about 79% ethanol; about 0.1% 2-undecanone and/or 2-tridecanone, about 5% DE, and about 1% to about 94.9% ethanol; about 0.5% 2-undecanone and/or 2-tridecanone, about 5% DE, and about 1% to about 94.5% ethanol; about 1% 2-undecanone and/or 2-tridecanone, about 5% DE, and about 1% to about 94% ethanol; about 5% 2-undecanone and/or 2-tridecanone, about 5% DE, and about 1% to about 90% ethanol; about 8% 2-undecanone and/or 2-tridecanone, about 5% DE, and about 1% to about 87% ethanol; about 10% 2-undecanone and/or 2-tridecanone, about 5% DE, and about 1% to about 85% ethanol; about 15% 2-undecanone and/or 2-tridecanone, about 5% DE, and about 1% to about 80% ethanol; about 20% 2-undecanone and/or 2-tridecanone, about 5% DE, and about 1% to about 75% ethanol; about 0.1% 2-undecanone and/or 2-tridecanone, about 10% DE, and about 1% to about 90.9% ethanol; about 0.5% 2-undecanone and/or 2-tridecanone, about 10% DE, and about 1% to about 89.5% ethanol; about 1% 2-undecanone and/or 2-tridecanone, about 10% DE, and about 1% to about 89% ethanol; about 5% 2-undecanone and/or 2-tridecanone, about 10% DE, and about 1% to about 85% ethanol; about 8% 2-undecanone and/or 2-tridecanone, about 10% DE, and about 1% to about 82% ethanol; about 10% 2-undecanone and/or 2-tridecanone, about 10% DE, and about 1% to about 80% ethanol; about 15% 2-undecanone and/or 2-tridecanone, about 10% DE, and about 1% to about 75% ethanol; about 20% 2-undecanone and/or 2-tridecanone, about 10% DE, and about 1% to about 70% ethanol; about 0.1% 2-undecanone and/or 2-tridecanone, about 15% DE, and about 1% to about 84.9% ethanol; about 0.5% 2-undecanone and/or 2-tridecanone, about 15% DE, and about 1% to about 84.5% ethanol; about 1% 2-undecanone and/or 2-tridecanone, about 15% DE, and about 1% to about 84% ethanol; about 5% 2-undecanone and/or 2-tridecanone, about 15% DE, and and about 1% to about 80% ethanol; about 8% 2-undecanone and/or 2-tridecanone, about 15% DE, and about 1% to about 77% ethanol; about 10% 2-undecanone and/or 2-tridecanone, about 15% DE, and about 1% to about 75% ethanol; about 15% 2-undecanone and/or 2-tridecanone, about 15% DE, and about 1% to about 70% ethanol; about 20% 2-undecanone and/or 2-tridecanone, about 15% DE, and about 1% to about 65% ethanol; about 0.1% 2-undecanone and/or 2-tridecanone, about 20% DE, and about 1% to about 79.9% ethanol; about 0.5% 2-undecanone and/or 2-tridecanone, about 20% DE, and about 1% to about 79.5% ethanol; about 1% 2-undecanone and/or 2-tridecanone, about 20% DE, and about 1% to about 79% ethanol; about 5% 2-undecanone and/or 2-tridecanone, about 20% DE, and about 1% to about 75% ethanol; about 8% 2-undecanone and/or 2-tridecanone, about 20% DE, and about 1% to about 72% ethanol; about 10% 2-undecanone and/or 2-tridecanone, about 20% DE, and about 1% to about 70% ethanol; about 15% 2-undecanone and/or 2-tridecanone, about 20% DE, and about 1% to about 65% ethanol; about 20% 2-undecanone and/or 2-tridecanone, about 20% DE, and about 1% to about 60% ethanol; about 0.1% 2-undecanone and/or 2-tridecanone, about 25% DE, and about 1% to about 74.9% ethanol; about 0.5% 2-undecanone and/or 2-tridecanone, about 25% DE, and about 1% to about 74.5% ethanol; about 1% 2-undecanone and/or 2-tridecanone, about 25% DE, and about 1% to about 74% ethanol; about 5% 2-undecanone and/or 2-tridecanone, about 25% DE, and about 1% to about 70% ethanol; about 8% 2-undecanone and/or 2-tridecanone, about 25% DE, and about 1% to about 67% ethanol; about 10% 2-undecanone and/or 2-tridecanone, about 25% DE, and about 1% to about 65% ethanol; about 15% 2-undecanone and/or 2-tridecanone, about 25% DE, and about 1% to about 60% ethanol; about 20% 2-undecanone and/or 2-tridecanone, about 25% DE, and about 1% to about 55% ethanol, and the like. As described herein, a formulation of the invention may comprise other components including but not limited to, one or more essential oils (e.g., geraniol, lavender, lemon grass) and/or other oils (e.g., cotton seed oil, vegetable oil, soybean oil, caster bean oil), and/or surfactants.

The applying or contacting of the compositions or formulation of the invention may be for a range of time (exposure time) from about 1 second to about 3 seconds, about 1 second to about 10 seconds, about 1 second to about 15 seconds, about 1 second to about 1 minute, about 1 second to about 5 minutes, about 1 second to about 15 minutes, about 1 second to about 1 hour, about 1 second to about 2 hours, about 1 second to about 6 hours, about 1 second to about 12 hours, about 1 second to about 18 hours, about 1 second to about 1 day, about 1 second to about 2 days, about 1 second to about 3 days, about 1 second to about 4 days, about 1 second to about 5 days, about 1 second to about 6 days, about 1 second to about 7 days, or more, and any range or value therein. Thus, in some embodiments, the time for applying may be about 1 second, 2 seconds, 3 seconds, 4 seconds, 5 seconds, 8 seconds, 9 seconds, 10 seconds, 15 seconds, 20 seconds, 30 seconds, 1 min, 2 min, 3 min, 4 min, 5 min, 6 min, 7 min, 8 min, 9 min, 10 min, 11 min, 12 min, 13 min, 14 min, 15 min, 20 min, 25 min, 30 mi, 1 hour, 2 hours, 3 hours, 4 hours, 5 hours, 6 hours, 7 hours, 8 hours, 9 hours, 10 hours, 12 hours, 15 hours, 20 hours, 1 day, 2 days, 3 days, 4 days, 5 days, 6 days, and/or 7 days. In representative embodiments, the time for applying may be about 1 second to about 10 seconds. In particular embodiments, the time for applying may be about 15 minutes.

As well understood, the percentage of eggs killed may depend on the concentration of the ovicide and the exposure time to the ovicide (e.g., the time for applying). Thus, applying or contacting of the compositions and formulations of the invention generally results in the killing of about 45% to about 100% (e.g., about 45, 50, 55, 60, 65, 70, 75, 80, 85, 90, 95, 100%) of the insect pest eggs for any given time period. However, the compositions and formulations are shown to work very quickly and efficiently, resulting in a killing of 100% of the insect pest eggs following a very short contact or application time. Thus, in some embodiments, a one to five second exposure results in a 100% kill of the insect pest eggs. In some embodiments, exposure of insect pest eggs to a formulation of 1% 2-undecanone and 1% DE for 3 seconds kills about 100% of the insect pest eggs. In some embodiments, exposure of insect pest eggs to a formulation of 8% 2-undecanone and 1% DE for 1 second kills about 100% of the insect pest eggs. In some embodiments, exposure of insect pest eggs to a formulation of 5% 2-undecanone for 1 second kills about 70% of the insect pest eggs. In some embodiments, exposure of insect pest eggs to a formulation of 15% 2-undecanone for about one to about five second kills about 100% of the insect pest eggs. As discussed herein, the formulations of the invention once applied may be effective for a wide range of time from about six hours to about five days.

In addition to being useful for treating of animals (hair, skin, etc.), the compositions of the invention may also be applied to cloth, wood and other surfaces for control of insect pest eggs, including but not limited to, fabrics (clothing, linens, draperies, etc.), furniture (e.g., chairs, mattresses, box springs, etc.), carpets, containers, walls, base boards, floors, air, water, nets, paper (e.g., food packaging), trash containers, dumps, soil and/or plants.

In some embodiments, when used as an ovicide on a plant, the formulation may comprise an oil emulsion (e.g., a plant based oil such as cottonseed oil)

In some embodiments, the applying or contacting may be repeated as needed. Thus, in some embodiments, the applying or contacting may be repeated every six hours, every 12 hours, every 24 hours, every other day, every three days, once a week, and the like, as needed. Formulations comprising 2-undecanone and/or 2-tridecanone, and DE provide additional benefits with the DE providing longer term control of the insects, thereby reducing re-infestation.

The methods, compositions, and formulations described herein may be used to kill eggs from any insect pest including, but are not limited to, tick eggs, mite eggs, spider eggs, millipede eggs, centipede eggs, and nematode eggs. Example insect pests whose eggs may be killed using the compositions, and formulations described herein include the following:

Hemiptera: Delphacidae (planthoppers) such as *Laodelphax striatellus* (small brown planthopper), *Nilaparvata lugens* (brown planthopper) and *Sogatella furcifera* (whitebacked rice planthopper); Cicadelloidea (leafhoppers) such as *Nephotettix cincticeps* (green rice leafhopper), *Nephotettix virescens* (green rice leafhopper) and *Recilia dorsalis*; Aphidoidea (aphids); stink bugs such as Pentatomidae, Acanthosomatidae, Urostylidae, Dinidoridae, Coreidae and Alydidae; Aleyrodidae (whiteflies); Tingidae (lace bugs); Psyllidae (jumping plantlice);

Lepidoptera: Pyralidae such as *Chilo suppressalis* (rice stem borer), *Cnaphalocrocis medinalis* (rice leafroller) and *Plodia interpunctella* (Indian meal moth); Noctuidae such as *Spodoptera litura* (tobacco cutworm), *Pseudaletia separata* (rice armyworm), *Mamestra brassicae* (cabbage armyworm); Pieridae such as *Pieris rapae crucivora* (common cabbageworm); Tortricidae such as *Adoxophyes* spp.; Carposinidae; Lyonetiidae; Lymantriidae (tussock moths); Plusiinae; *Agrotis* spp. such as *Agrotis segetum* and *Agrotis ipsilon* (black cutworm); *Heliotis* spp.; *Plutella xylostella* (diamondback moth); *Tinea pellionella* (casemaking clothes moth); *Tineola bisselliella* (webbing clothes moth);

Diptera: *Culex* spp. such as *Culex pipiens pallens* (common mosquito) and *Culex tritaeniorhynchus*; *Aedes* spp. such as *Aedes aegypti* and Aedes albopictus; *Anopheles* spp. such as *Anopheles sinensis*; Chironomidae (midges); Muscidae such as *Musca domestica* (housefly), *Muscina stabulans* (false stablefly) and *Fannia canicularis* (little housefly); Calliphoridae; Sarcophagidae; Anthomyiidae such as *Delia platura* (seedcorn maggot) and *Delia antiqua* (onion maggot); Tephritidae (fluit flies); Drosophilidae; Psychodidae (moth flies); Simuliidae (black flies); Tabanidae; Stomoxyidae; Ceratopogonidae (biting midges);

Coleoptera (beetles): *Diabrotica* spp. (corn rootworms) such as *Diabrotica virgifera* (western corn rootworm) and *Diabrotica undecimpunctata howardi* (southern corn rootworm); Scarabaeidae such as *Anomala cuprea* and *Anomala rufocuprea* (soybean beetle); Curculionidae such as *Sitophilus zeamais* (maize weevil) and *Lissorhoptrus oryzophilus* (ricewater weevil); Tenebrionidae (darkling beetles) such as *Tenebrio molitor* (yellow mealworm) and *Tribolium castaneum* (red flour beetle); Chrysomelidae such as Phyllotreta striolata (striped flea beetle) and *Aulacophora femoralis* (cucurbit leaf beetle); Anobiidae; *Epilachna* spp. such as *Epilachna vigintioctopunctata* (twentyeight-spotted ladybird); Lyctidae (powder post beetles); Bostrychidae (false powder post beetles); Cerambycidae; *Paederus fuscipes* (robe beetle);

Dictyoptera: *Blattella germanica* (German cockroach); *Periplaneta fuliginosa* (smokybrown cockroach); *Periplaneta americana* (American cockroach); *Periplaneta brunnea* (brown cockroach); *Blatta orientalis* (oriental cockroach);

Thysanoptera: *Thrips palmi*; *Thrips hawaiiensis* (flower thrips); thunderflies, thunderbugs, corn lice and other thrips;

Hymenoptera: Formicidae (ants); Vespidae (hornets); Bethylidae; Tenthredinidae (sawflies) such as *Athalis rosae ruficornis* (cabbage sawfly);

Orthoptera: Gryllotalpidae (mole crickets); Acridadae (grasshoppers);

Siphonaptera: *Ctenocephalides canis* (dog flea); *Ctenocephalides felis* (cat flea); *Pulex irritans*;

Anoplura: *Pediculus humanus capitis*; *Pediculus humanus corpori*, *Pthirus pubis*;

Isoptera: *Reticulitermes speratus*; *Coptotermes formosanus*;

Tetranychidae: *Tetranychus cinnabarinus* (carmine spider mite); *Tetranychus urticae* (two-spotted spider mite); *Tetranychus kanzawai* (Kanzawa spider mite); *Panonychus citri* (citrus red mite); *Panonychus ulmi* (European red mite);

House-dust mites: Acaridae; Dermatophagoidinae; Pyroglyphinae; Cheyletidae; Macronyssidae such as *Ornithonyssus* spp.;

Ticks: Ixodidae such as *Boophilus microplus*; and

Termites, including drywood, subterranean termites (or ground termites, including Eastern, Western, and Desert termites), and Formosan termites (sometimes referred to as Formosan subterranean termites or the "super termite").

The term "lice" or "louse" as used herein includes any type of "lice" or "louse," including, but not limited to, head lice, (*Pediculus humanus capitis*), body lice (*Pediculus humanus corporis*), and/or crab (pubic) lice (*Pthirus pubis*).

The invention will now be described with reference to the following examples. It should be appreciated that these examples are not intended to limit the scope of the claims to the invention, but are rather intended to be exemplary of certain embodiments. Any variations in the exemplified methods that occur to the skilled artisan are intended to fall within the scope of the invention.

EXAMPLES

Example 1

Killing Body Lice Eggs

Figure 1A:
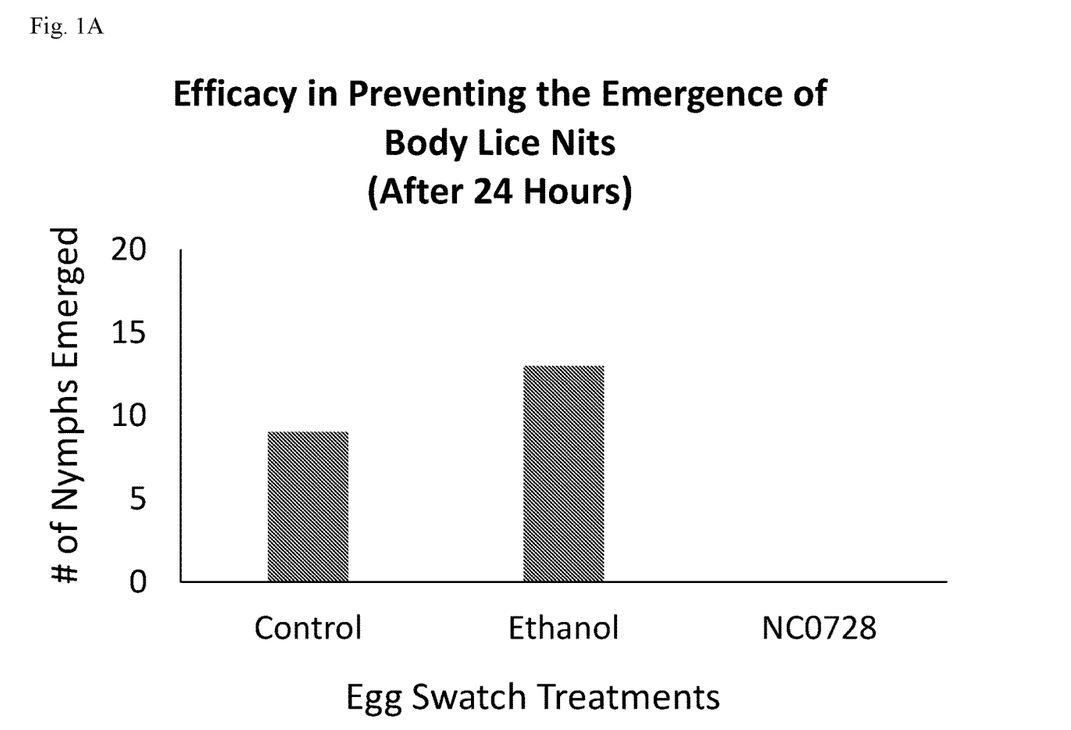
FIG. 1A-1B shows the effect of 100% ethanol or a 15% 2-undecanone formulation (NC0728) on body lice eggs 24 hours (FIG. 1A) and 45 hours (FIG. 1B) after treatment.
Figure 1B:
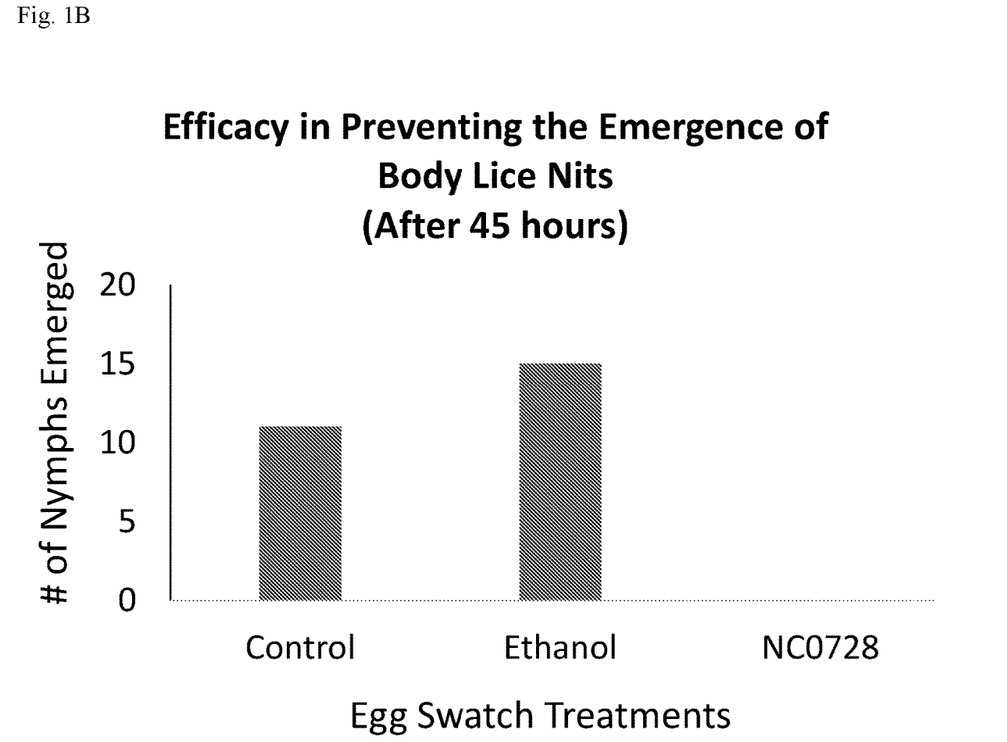

Small, roughly equal-sized body lice nit swatches (25 to 100 eggs/replicate) were dipped into treatment solutions for five seconds using forceps. The treatments included 100% ethanol and a 15% solution of 2-undecanone (NC0728). The experiments included a no treatment control. The treated and control swatches were maintained at 27° C. and relative humidity of 76% in an insectary for duration of experiment. The number of lice that emerged were counted after 24 hours and 45 hours, with the count being cumulative over 45 hours total. The results are shown in FIGS. 1A-1B. One louse died in the ethanol treatment.

Example 2

Killing Insect Eggs Using a Cotton Bollworm Model System

Newly oviposited eggs of the cotton bollworm were used as model insect eggs to examine the synergism between 2-undecanone and DE from a commercial source (Sigma, DE with no insecticidal activity). Due to their obligate parasitic lifestyle, lice, head lice, in particular, are very difficult to obtain. Thus, bollworm eggs were used in place of lice eggs for the experiments showing efficacy of the treatments described herein. Notably, bollworm eggs are understood to be more robust than lice eggs as a result of their method of deposition on leaves, which requires that they survive direct sunlight, wind, rain, predation and parasites. Therefore, it is understood that if the treatment works on bollworm eggs, it will also work on the eggs of head lice. Further, the experiments using body lice, a recognized proxy for head lice, confirmed the effectiveness of the treatment with the formulations of this invention.

All treatments were conducted by dipping the bollworm eggs in the different treatments for 3 seconds, allowing the eggs to dry at room temperature, and then assessing egg hatch for the following 4 days. The eggs typically hatch under these conditions in 2.5 days. The solvent used in these experiments was absolute ethanol.

Figure 2:
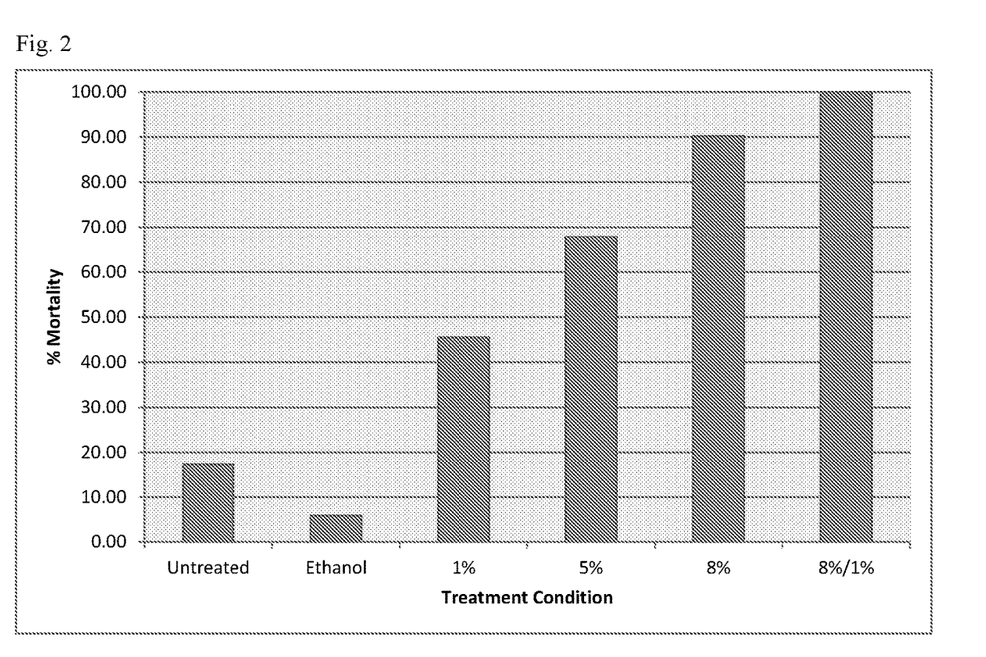
FIG. 2 shows the percent mortality of bollworm eggs treated with 1%, 5%, 8% 2-undecanone or 8% 2-undecanone plus 1% DE (Thomas Labs).

FIG. 2 shows that a dose response was obtained with increasing amounts of 2-undecanone (from 1 to 8%), resulting in an increase in egg mortality to very high levels (up to about 90% under the testing conditions). The combination of 2-undecanone with DE at 1% enhanced the activity of the natural product. Alone, the DE used here was shown not to be insecticidal.

Thus, these data show that not only are the compositions of the invention effective for killing bollworm eggs but show that the bollworm egg system can be used effectively as a model system for lice eggs.

Example 3

Synergistic Effect of 2-undecanone and DE on Bollworm Egg Hatching

Sheets were cut with approximately 25 bollworm eggs per sheet. Three replicates of two solutions were tested: (1) 1% 2-undecanone in ethanol or (2) 1% 2-undecanone/1% DE (Thomas Labs DE) in ethanol.

Eggs were dipped in solutions for 1 second and allowed to dry for 10 minutes at room temperature before being placed in sealed petri dishes. Eggs were stored at 76° F. and hatching monitored every 24 hours for 4 days. The results are shown in FIG. 3.

Figure 3:
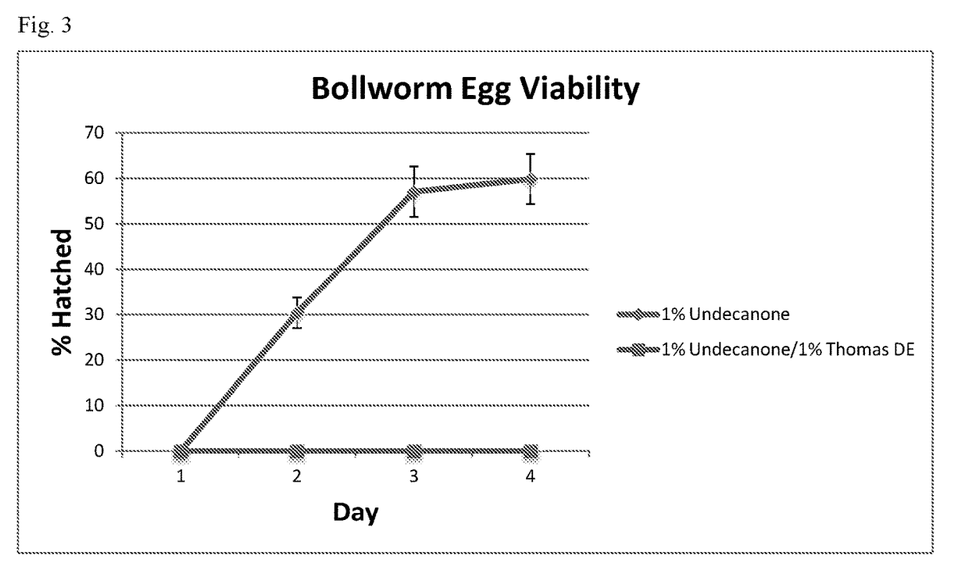
FIG. 3 shows the bollworm egg viability following treatment with (1) 1% undecanone in ethanol (♦) or (2) 1% undecanone/1% DE (Thomas Labs) in ethanol (■).

FIG. 3 shows the synergism between 1% 2-undecanone and DE as the 2-undecanone with DE was much more effective at reducing egg hatching when compared to 1% undecanone alone.

Example 4

Effect of Diatomaceous Earth (DE) on Bollworm Egg Hatching

Sheets were cut with approximately 25 bollworm eggs per sheet. Four replicates of three solutions were tested: (1) Untreated; (2) 1% Thomas Labs DE or (3) 1% Sigma DE.

Figure 4:
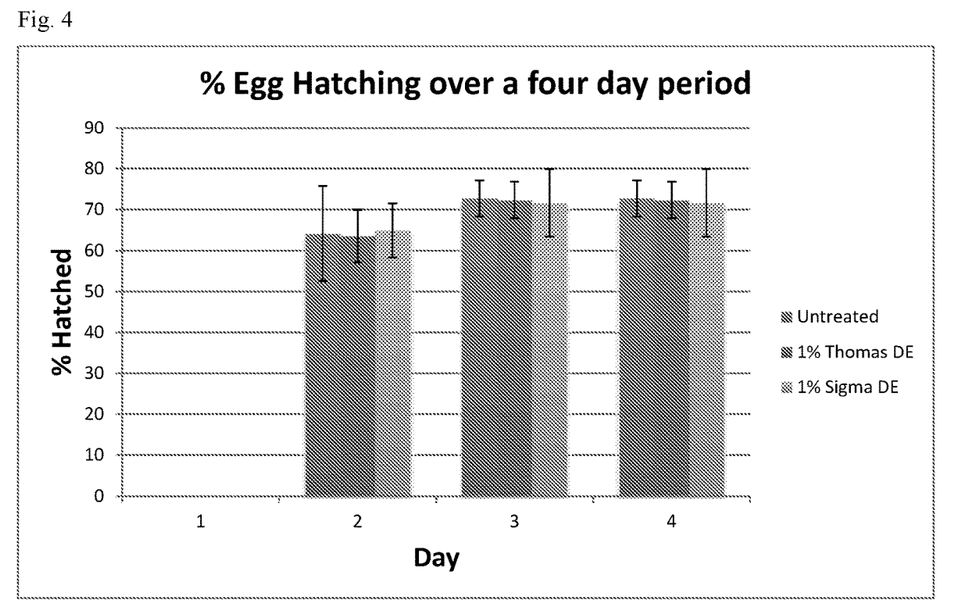
FIG. 4 shows the percentage of bollworm eggs that hatched over a four day period following (1) no treatment or (2) treatment with two types of diatomaceous earth (DE), 1% Thomas Labs DE or (3) 1% Sigma DE.

Eggs were dipped in solutions for 1 second and allowed to dry for 10 minutes at room temperature before being placed in sealed petri dishes. Eggs were stored at 76° F. and hatching monitored every 24 hours for 4 days. The results are provided in FIG. 4 and show that DE alone has the same effect on bollworm egg hatching as no treatment at all.

2-undecanone has been approved by the US EPA for use on human skin at 7.75% without restrictions (including children) and is shown to kill all stages of the lice. While the mechanical insecticide (DE) has no inherent ovicidal activity, it appears to synergize the ovicidal activity of 2-undecanone. Notably, the 2-undecanone results in minimal residual activity against eggs (typically, it evaporates in 30 min or less). The remaining mechanical insecticide (DE) persists to continue controlling the larval and adult stages for as long as the application site (e.g., head) is not washed. Thus, this residual activity of the mechanical insecticide can reduce re-infestation by killing any insect pests that may later attempt to re-infest the site.

The foregoing is illustrative of the present invention, and is not to be construed as limiting thereof. The invention is defined by the following claims, with equivalents of the claims to be included therein.

The which is claimed is:

1. A method of killing lice eggs, comprising contacting the lice eggs with an effective amount of a composition comprising 2-undecanone and/or 2-tridecanone, thereby killing the lice eggs.

2. A method of killing lice eggs on a subject infested with lice eggs or suspected of being infested with lice eggs, comprising applying to the subject an effective amount of a composition comprising 2-undecanone and/or 2-tridecanone, thereby killing the lice eggs on the subject.

3. A method of reducing the risk of infestation or re-infestation of lice eggs on a subject by lice, comprising applying to the subject an effective amount of a composition comprising 2-undecanone and/or 2-tridecanone, thereby killing the lice eggs on the subject.

4. The method of claim 1, wherein the composition comprises about 0.01% to about 30% by weight of 2-undecanone and/or about 0.01% to about 30% by weight of 2-tridecanone.

5. The method of claim 1, wherein the composition further comprises a solid carrier, a liquid carrier, or a gaseous carrier.

6. The method of claim 5, wherein the solid carrier is a powder or granules of cellulose, clays, talc, ceramics, and/or other inorganic minerals.

7. The method of claim 1, wherein the composition further comprises diatomaceous earth.

8. The method of claim 7, wherein the composition comprises about 1% to about 99.99% diatomaceous earth.

9. The method of claim 5, wherein the liquid carrier is water, a surfactant, an oil, an organic solvent, or any combination thereof.

10. The method of claim 9, wherein the surfactant is an alkyl sulfate, alkylsulfonate, alkylarylsulfonates, alkyl aryl ether, polyoxyethylenealkyl aryl ether, polyethylene glycol ether, polyhydric alcohol ether, sugar alcohol derivative, or any combination thereof.

11. The method of claim 9, wherein the organic solvent is ethanol and/or methanol.

12. The method of claim 5, wherein the gaseous carrier is air, carbon dioxide, and/or nitrogen.

13. The method of claim 1, wherein the composition is in the form of a powder, liquid, aerosol, gel, foam, lotion, or ointment.

14. The method of claim 1, wherein the killing occurs in about 1 second to about 10 seconds following the contacting of the lice eggs with the effective amount of the composition or after applying to the subject the effective amount of the composition, resulting in the killing of about 45% to about 100% of the lice eggs.

15. The method of claim 1, wherein the contacting comprises contacting a site of lice infestation on a subject with a dry shampoo, liquid shampoo, conditioner, creme rinse, mousse, foam, lotion, ointment, and/or aerosol comprising the composition.

16. The method of claim 2, wherein the composition is applied to the subject in the form of a dry shampoo, liquid shampoo, conditioner, creme rinse, mousse, foam, lotion, ointment, and/or aerosol that comprises the composition.

17. The method of claim 1, wherein the contacting comprises:
covering a site of infestation on a subject having or being suspected of having lice eggs with a cap, wherein the cap comprises an inner side and an outer side, and the inner side is in contact with the site of infestation on the subject and comprises the composition; and
massaging the cap while the cap is on the site of infestation, thereby massaging the composition into the subject's hair and scalp.

18. The method of claim 2, wherein the applying comprises:
covering a site of infestation on a subject having or being suspected of having lice eggs with a cap, wherein the cap comprises an inner side and an outer side, and the inner side is in contact with the site of infestation on the subject and comprises the composition; and
massaging the cap while the cap is on the site of infestation, thereby massaging the composition into the subject's hair and scalp.

19. The method of claim 2, wherein the composition that is applied to the subject or contacted with the lice eggs is therapeutically effective for about six hours to about live days.

* * * * *

UNITED STATES PATENT AND TRADEMARK OFFICE
CERTIFICATE OF CORRECTION

PATENT NO. : 10,779,532 B2
APPLICATION NO. : 16/321126
DATED : September 22, 2020
INVENTOR(S) : Richard Michael Roe It is certified that error appears in the above-identified patent and that said Letters Patent is hereby corrected as shown below:

In the Claims

Column 15, Line 12, Claim 10:
Please correct "alkylarylsulfonates" to read -- alkylarylsulfonate --

Column 16, Line 29, Claim 19:
Please correct "live" to read -- five --

Signed and Sealed this
Tenth Day of May, 2022

Katherine Kelly Vidal
*Director of the United States Patent and Trademark Office*